Feb. 13, 1923.
J. F. KOHLER
PARING MACHINE
Original Filed July 28, 1919    3 sheets-sheet 1
1,445,145
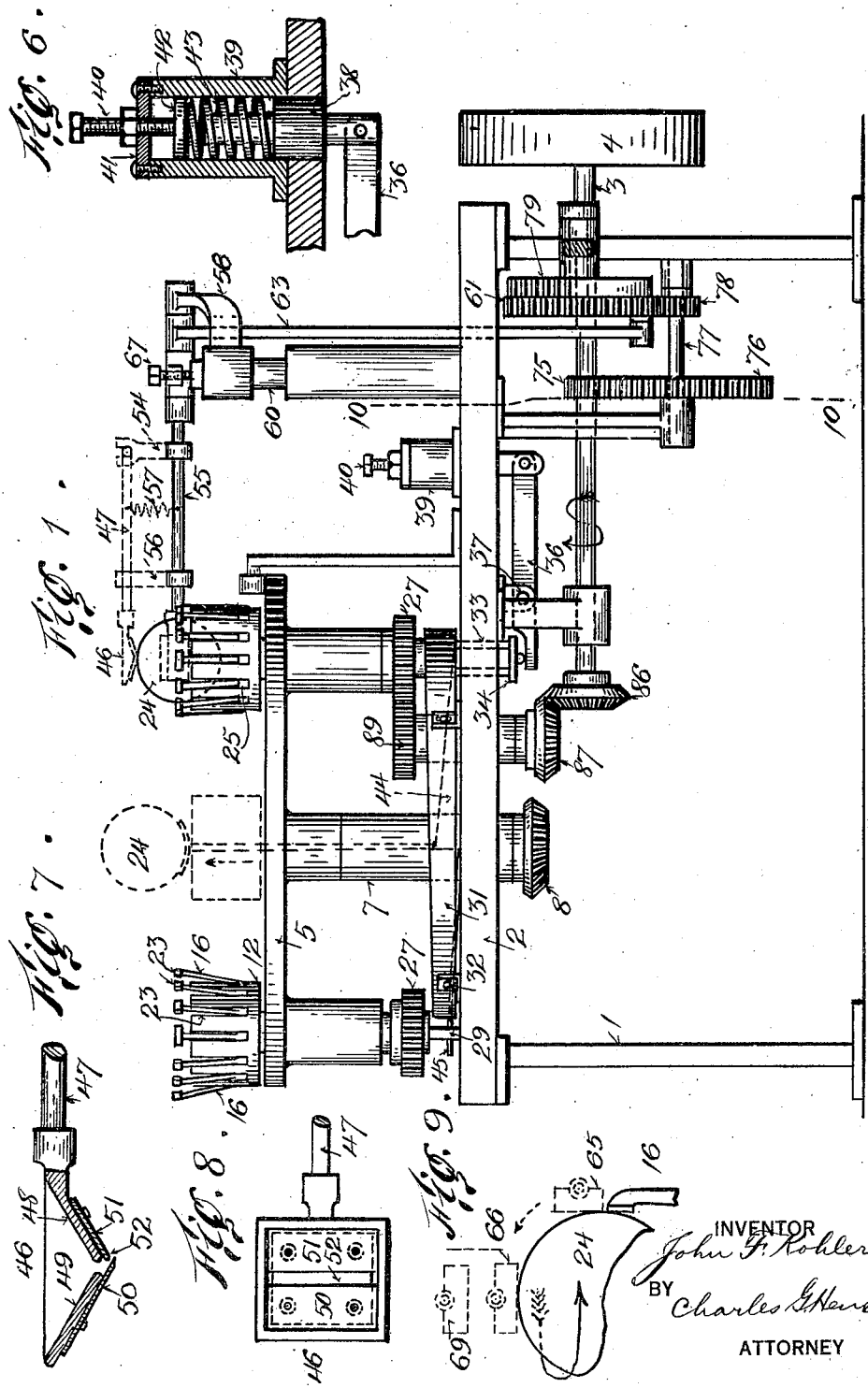
INVENTOR
John F. Kohler
BY Charles G. Hensley.
ATTORNEY

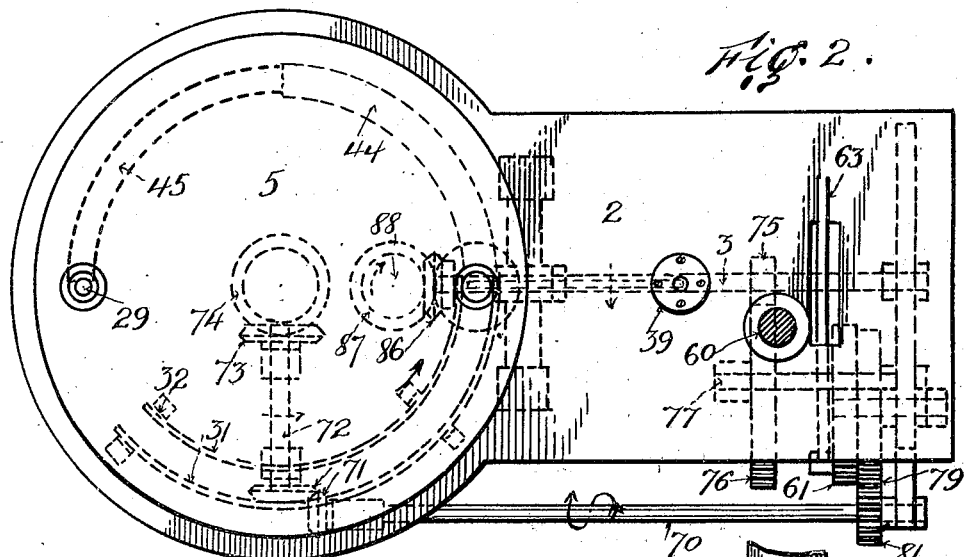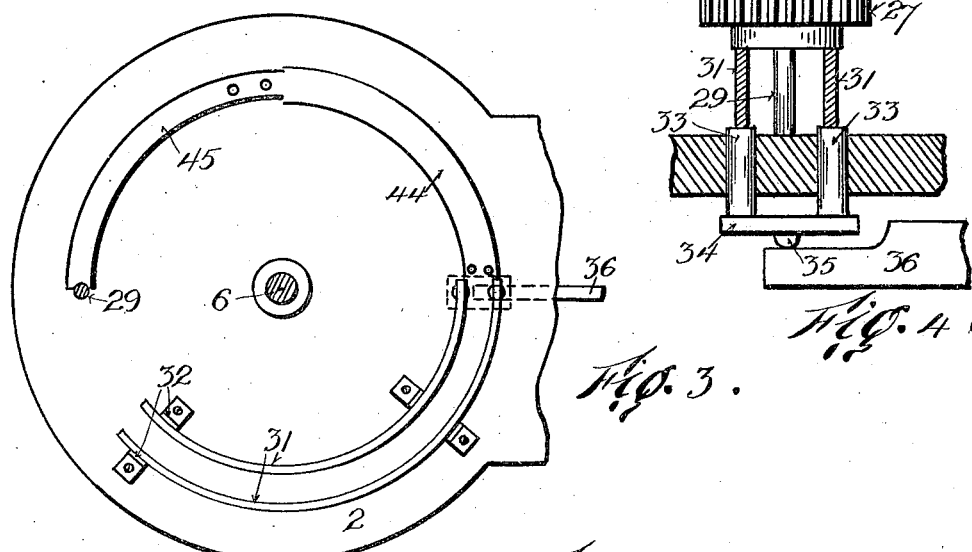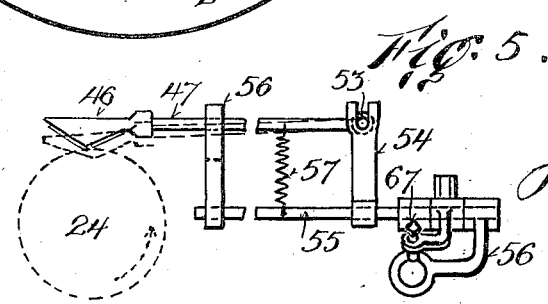

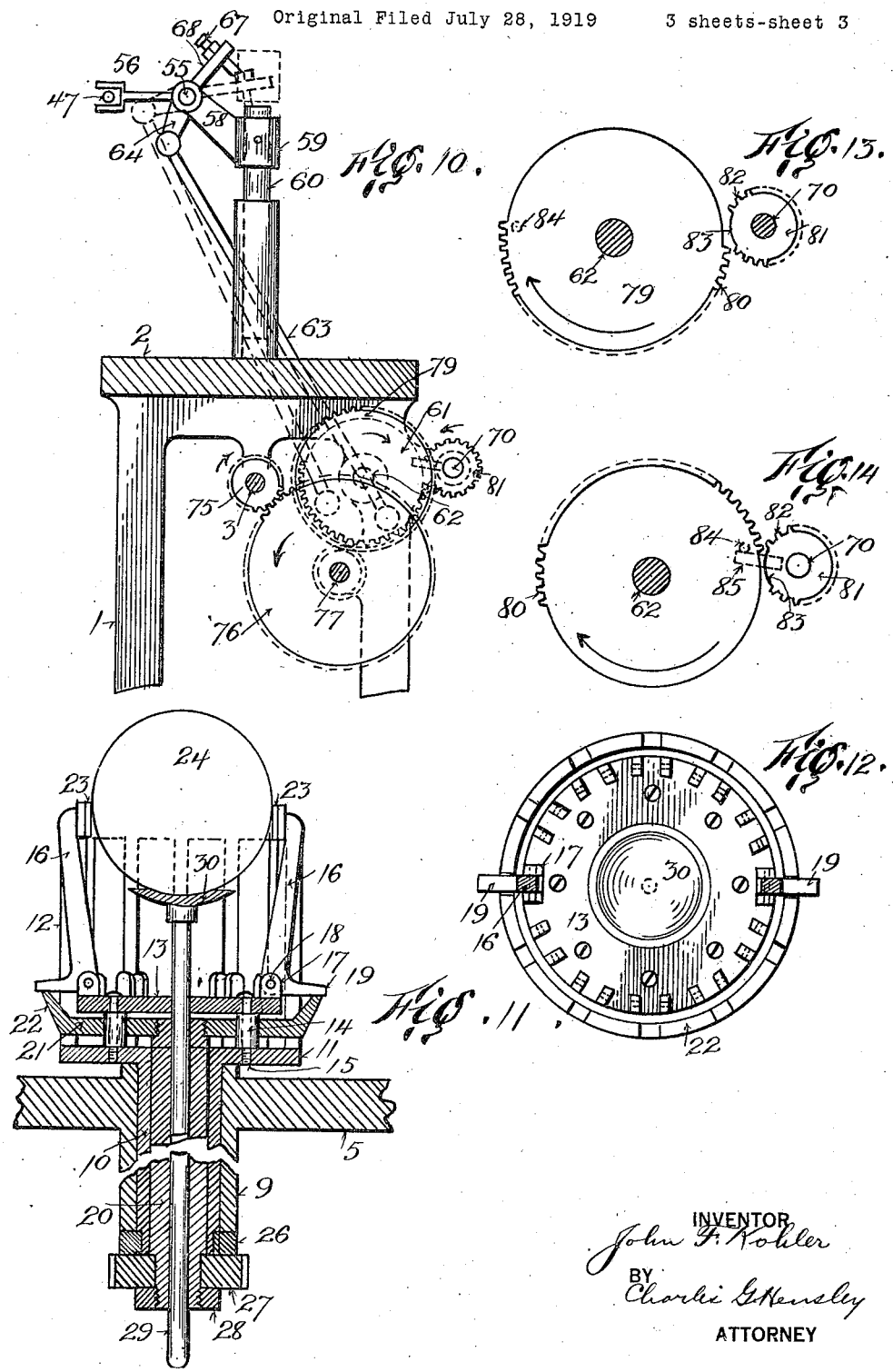

Patented Feb. 13, 1923.

1,445,145

UNITED STATES PATENT OFFICE.

JOHN F. KOHLER, OF WHITE PLAINS, NEW YORK.

PARING MACHINE.

Application filed July 28, 1919, Serial No. 313,751. Renewed August 8, 1922. Serial No. 580,567.

*To all whom it may concern:*

Be it known that I, JOHN F. KOHLER, a citizen of the United States, and a resident of White Plains, Westchester County, and State of New York, have invented certain new and useful improvements in Paring Machines, of which the following is a specification.

My invention relates to a machine for paring edible products and it is especially adapted for paring the thin brown skin from the meat or kernel of cocoanuts. When a cocoanut has had its shell removed there is left the nearly round ball or kernel which is covered with a thin brown skin and it is necessary or desirable, in preparing the cocoanut for commercial uses, to remove this skin without injuring the meat of the cocoanut and with as little loss of the latter as possible in the paring operation. Heretofore, it has been customary to remove this skin by hand work, the parers using a hand spokeshave in the process. The object of my present invention is to provide a machine which will pare the skin from the cocoanut evenly, rapidly, and economically so that there is no waste of the cocoanut meat. The present machine embodies simple and efficient means for holding and revolving the cocoanuts without injury, means for presenting them successively in position for paring them, and means for paring the cocoanuts. The latter is adapted to pare cocoanuts of varying sizes without dwelling at the same position long enough to remove any substantial part of the meat. In order to accomplish this, the device must be adapted to pare the larger size cocoanut, but in paring any below the maximum size the knife must so operate as not to dwell in one place on the cocoanut of smaller size as otherwise it would continue to pare away the meat after the skin is removed and this would result in a loss of some of the meat at least on all cocoanuts less than the maximum in size. The present device, while completely paring cocoanuts of different sizes cause no waste of meat.

The present device is simple in construction and operation and easily kept in order.

In the drawings forming part of this application,

Figure 1 is a side elevation of the machine with the turret operating mechanism removed.

Figure 2 is a longitudinal sectional view thereof, showing most of the machine in plan, the holding devices being omitted in this view, Figure 3 is a sectional view showing the cam rails in plan, Figure 4 is an enlarged sectional view, Figure 5 is a plan view of the paring device in position to start paring, Figure 6 is an enlarged sectional view showing the device for adjusting the cam rails, Figure 7 is a sectional view of the paring knife, Figure 8 is a face view thereof, Figure 9 is a diagrammatic view showing the path of movement of the paring knife during the paring operation, Figure 10, is a sectional view taken on the line 10—10 of Figure 1, showing the mechanism for operating the paring knife, Figure 11, is a vertical sectional view showing the nut holding and turning device, Figure 12 is a plan view thereof, with some of the clamps omitted, Figures 13 and 14 are detail views of the means for intermittently revolving the turret.

The machine is shown herein as mounted or built upon a frame consisting of the standards 1 and a top or table 2 and these parts may take any form which may be found suitable for the purpose. There is a main shaft 3 supported upon the frame and from which the various parts of the mechanism are operated. This shaft may be driven by any convenient source of power and I have shown a pulley 4 on the outer end of the shaft, which may be operated by a belt from any source of power. If desired, this shaft may be operated by an electric motor directly connected therewith. Near the opposite side of the machine from the driving pulley I have mounted above the table 2 a turret 5 which is spaced some distance above the table and it is revolvable in the cylinder 7 and it carries the nut holding and revolving devices. This turret is mounted to revolve with a central shaft 6 which projects down through the table 2 and which is provided at its lower end with a mitre gear 8 through which this shaft is driven. The nut holding and ejecting devices carried by the turrets are constructed as follows:

There are vertical bosses or cylinders 9 projecting downwardly from the turret 5 toward the table and these act as guides for various parts of the nut holding and ejecting devices. There is a sleeve 10 revoluble in each boss 9 and above the turret this sleeve carries a base 11 from which extends upwardly a casing or shell 12 which is somewhat larger in diameter than the largest cocoanuts to be handled in the machine. There is a circular plate 13 supported above the base 11 on sleeves 14 and secured by bolts 15. Clamping members or grippers 16 are fulcrumed at 18 to upstanding ears 17 on the plate 13. These clamps 16 are arranged in circular form around the plate 13 and they are adapted to swing on planes parallel with the radii of the plate or toward and from its axis. At the lower end and outside the fulcrum 18 each clamp is provided with a heel 19 by means of which the clamps are operated to swing toward the axis of the plate 13. There is a sleeve 20 slidable inside the sleeve 10 and it carries a plate 21 which is movable vertically between the base 11 and the plate 13. This plate 21 has an upturned reticulated flange 22 which engages the several heels 19 for the purpose of rocking the several clamps inwardly. The upper ends of the clamps are provided with shoes 23 all arranged in the same horizontal plane, and these are adapted to engage at intervals around the outside of the cocoanut 24 as shown in Figure 11.

The cylinder 12 is provided with slots 25 into which the sections of the flange 22 project and in which the several clamps swing, so that the latter are free to swing toward and from the axis of the nut holding device, but they are guided against lateral displacement by the cylinder 12. The nut holding device as a whole is adapted to revolve in the boss 9, and the sleeve 20 and its plate 21 are adapted to reciprocate relatively to the clamps. The sleeve 10 is reduced in diameter at the bottom and it carries a washer 26. There is a gear 27 held on the sleeve 20 by a nut 28 and through this gear the nut holding device as a whole is revolved.

There is a spindle 29 slidable in the sleeve 20, its lower end projecting below the sleeve 20 and its upper end projecting above the plate 13, where it carries a plate 30 having a concave top surface adapted to receive and support the cocoanut. This spindle 29 is adapted to rise and fall as will be pointed out.

There is a cam track consisting of rails 31 pivoted at 32 to the table 2 and they are arc shaped so as to lie under the path of travel of the cocoanut holding devices. The upper edges of these rails 31 slant upwardly toward the paring position and the track is adjustable to alter its inclination. There are posts 33 (see Fig. 4) slidable through apertures in the table 2 and below the latter they are connected by a cross bar 34 so that they move together. There is a contact ball 35 on the under side of the bar 34 which rests on one end of a lever 36 which is pivoted at 37 in a bracket. As shown in Figure 6, the other end of this lever has pivoted thereto a plunger 38 which slides vertically in a fixed tube or guide 39. There is a bolt 40 screwed through the cap 41 and it is provided with a head 42 which presses down on the top of a coiled spring 43, the latter in turn pressing down on the plunger 38. By regulating the screw 40 the lever 36 may be pressed down more or less for the purpose of elevating the opposite end of the lever and thus elevating the cam track 31 at the end near the paring position. It will be apparent that the track 31 is not rigid but that it can rise or fall on account of the spring 43 which permits but resists the downward movement of the track and restores it to position. The rails of the track engage the gear 27 on the lower end of the sleeve 20 so that as the turret revolves, one of the nut holding devices travels over the track 31, and as it passes over the fulcrum 32 of the track the gear 27 engages the track and while the turret is revolving the track raises the sleeve 20 under the resistible action of the spring 43 and the upward movement continues until the nut holding device reaches the paring position. When the sleeve 20 is moved upwardly by the track the plate 21 lifts and the flange members 22 press on the heels 19 of the several clamps. This throws the upper ends of the clamps inwardly until they press tightly around the cocoanut which was placed on the support 30, the latter at this time being in its lower position. The cocoanut is then gripped and held by the support 30 and by the several clamps. The grip of the clamps gradually tightens until the cocoanut reaches the paring position when the grip reaches its maximum. At the time the holding device reaches the paring position the turret stops revolving for a short period and the holding device is revolved very rapidly by mechanism to be hereinafter described.

When the paring operation is completed the turret again revolves to bring a new holding device into paring position and the one which was in operation is moved away. As the latter travels around a quarter circle the spindle 29 engages an inclined cam plate 44, first engaging the lower portion of its surface and gradually moving onto its higher portion. The cam member 44 while the turret is turning, raises the spindle 29 and its support 30 and this lifts the cocoanut, which was previously pared, up to the dotted line position shown in Figure 1, so that the cocoanut is ejected from the machine. It will be understood that when the turret commences to revolve in the operation just described, the gear 27 passes off the track 31 and it therefore falls to its lower position and this releases the grip of the clamps 16 on the cocoanut preparatory to the upward movement of the spindle 29. As the turret continues to turn the rod 29 disengages from the cam member 44 and it engages a contiguous spring member 45 which is gradually depressed until the rod 29 passes off the end and then the spring prevents back movement of the rod 29 and turret.

The paring device includes a knife 46 mounted on an arm 47 and having inclined plates 48, 49. On one of these is secured a knife blade 50 and on the other is secured a guard 51 the edges of these two members being spaced apart at 52 to allow the shaving to pass through. The guard 51 rests against the cocoanut and controls the depth of cut of the blade, so that only the outer brown skin of the cocoanut will be pared.

The knife arm 47 rocks on a pivot 53 in the arm 54 projecting from a shaft 55 and it is guided in a forked arm 56 also carried on the shaft 55. The spring 57 connected between the knife lever 47 and the shaft 55 draws over the former to press the knife against the cocoanut.

Preferably, the shaft 55 is adapted to rock and to rise and fall. I have shown this shaft mounted in a bearing on the end of an arm 58 which projects from a hub 59. The latter is slidable up and down on the post 60, so that the shaft 55 may rise and fall with the arm 58. There is a gear wheel 61 on the shaft 62 and the pitman 63 has one end pivoted to the face of this gear 61 the other end of the pitman being pivoted to an arm 64 fixed to the shaft 55. The crank motion on the pitman causes the shaft 55 to rock and this causes the paring knife to travel in an arc of about 90°, in which movement it will travel from the position 65 in Figure 9 to the position 66. There is an adjustable stop screw 67 carried on an arm 68 which is fixed to the shaft 55 and this stop screw is adapted to come into contact with the top of the post 60. When the pitman rocks the shaft 55 the latter and the knife lever 47 will turn in the arc of a circle whose center is in the axis of this shaft 55 and if the screw 67 is adjusted to strike the post 60 near the end of the rotation of the shaft 55 the screw will strike the post and the further upward motion of the pitman 63 will cause the bearing 59, arm 58, shaft 55 and the knife to rise upwardly, the screw 67 acting as a fulcrum for the several parts. This action causes the knife to rise from the position 66 in figure 9 to the position 69, during which the knife moves off the cocoanut and it allows the latter to pass under it as the turret is advanced to bring another cocoanut into position. If the arc traversed by the knife from the position 65 to the position 66 corresponds to the smaller cocoanuts, the knife will simply leave the cocoanut at the position 66 and continue inactive to the position 69; but when the cocoanut is of a larger size the knife will continue to operate on it until the knife reaches some position above the position 66. In every case the knife will discontinue paring at a point over the vertical axis of the cocoanut.

The turret is operated from the shaft 70, through the mitre gears 71, the cross shaft 72 and the mitre gears 73, 74, these parts serving to turn the shaft 6 which carries the turret.

The turret moves intermittently making a half revolution each time it moves. On the main shaft 3 there is a small gear 75 which operates a larger gear 76 on the short shaft 77. There is a small gear 78 on the latter shaft, which operates the larger gear 61 to which the pitman 63 is connected. At one side of the gear 61 and on the same shaft there is a mutilated gear 79 one half of which has teeth 80 and the other half of which is smooth. There is a small mutilated gear 81 on the shaft 70, having teeth 82 and a smooth portion 83 and this gear is operated by the gear 79. The latter has a pin 84 which acts on the arm 85 of the gear 81 to pick up the latter and start its teeth 82 in mesh with the teeth 80 of the larger gear 79. When the larger gear 79 makes a complete revolution its pin 84 acts on the arm 85 to pick up the gear 81 which then begins to mesh with the teeth 80 and the smaller gear makes a revolution and then stops when its smooth portion again comes opposite the gear 79. The latter continues to revolve until the pin 84 again picks up the gear 81. Thus, the movement of the gear 81 is an intermittent one and there is a multiplying ratio as between the gears 79 and 81. Through this motion the turret is revolved a half revolution intermittently to bring the cocoanut holders successively into paring position.

On the end of the main shaft 3 there is a mitre gear 86 which meshes with a mitre gear 87 on the shaft 88. The latter passes through the table 2 and above the latter it carries a gear 89 with which the gears 27 on the nut holding devices are adapted to mesh when the holding devices come into paring position. When these gears 89, 27 are in mesh the complete holding device is revolved, the number of revolutions being sufficient to insure the removal of a complete shaving of skin from the cocoanut while the paring knife is making its upward swing.

Operation: The operator will place a cocoanut in one of the holding devices while the latter is in the position shown at the left in Figure 1. At this time the clamps 16 are open, and the operator simply places the cocoanut on the plate 30, and this cocoanut requires no further attention.

After a cocoanut has been thus fed to the machine the turret is turned a half revolution. While making this half revolution the track 31 raises the sleeve 20, the plate 21 and this causes the clamps 16 to move inwardly and clamp the cocoanut which was placed on the support 30, so that by the time the cocoanut has reached the paring knife it is tightly clamped in the holder. When the turret is making this half turn the opposite holder is moving from the paring position to the receiving position. During this movement the spindle 29 on the returning holding device engages the cam 44 and is raised so that the cocoanut is lifted free of the clamps and is ejected or discharged into any suitable receptacle or conveyor. It will be understood that the clamps 16 are released as the holding device passes beyond the track 31 so that the cocoanut is released by the clamps 16 in time for the ejecting operation. By the time the holding device returns to the position near the operator it is ready to receive another cocoanut.

As a holding device reaches the paring position its gear 27 comes into mesh with the gear 89 and the sleeves 20, 10 and spindle 29 are revolved rapidly during one of the stationary periods of the turret. As the holder and cocoanut revolve, the paring knife is presented against the cocoanut at the central line thereof and the knife then rises around the cocoanut. As the latter revolves, the knife pares off the outer skin in the form of a continuous shaving and when the knife reaches the apex of the cocoanut it continues to rise, leaving the cocoanut free to shift with the holding device to the discharge position. When the pitman 63 reverses its direction of movement or goes down following the paring operation, the knife returns to its initial position ready for the next paring operation.

The present machine is designed to pare only one half the cocoanut at one operation. To pare the other half the cocoanut may be inverted and refed to the holding device by hand, but the method which I prefer to follow is to have separate machines and to feed the cocoanuts in the first instance to one machine for paring half the cocoanut and to have the half-pared cocoanuts pass on to a second machine and then fed in reverse position to the latter for paring the other half. This method insures less handling or more rapid handling than where the cocoanuts are returned to the same machine for the second paring operation.

It is necessary to pare the shelled cocoanut without breaking it, for well known commercial reasons, and heretofore it has been difficult to mechanically pare them without cracking or breaking the cocoanut so that most if not all of this work is now done by hand. The present holding and revolving devices operate efficiently without injuring the cocoanut. The clamps 16 are actually held by spring action because the pressure of the cam track 31 on the closing sleeve 20 is controlled by the spring 43 and the pressure is adjustable from time to time through the screw 40. The cocoanut is really supported by the member 30, and the clamps 16 hold the cocoanut so that it revolves with the holding device.

The weight of the cocoanut comes on the plate 30 and less pressure by the clamps 16 is required to grip and hold the cocoanut than if the clamps alone supported it.

Having described my invention, what I claim is:

1. A paring machine comprising a paring knife and means for moving it in relation to the product, a revolving turret, revolving means carried by the turret and including clamping members adapted to be closed upon a nut or similar product, means for intermittently rotating said turret to present said holding means into position for the product to be acted upon by said knife, means adapted to automatically and gradually close said clamping members on said product as said holding device approaches the paring position and adapted to release said clamping members when said holding device leaves the paring position.

2. A paring machine comprising a movable paring knife and a revolving turret, revolvable holding means carried by said turret and including clamping members adapted to be closed upon a nut or similar product, means for intermittently rotating said turret to present said holding means into position for the product to be acted upon by said knife, means adapted to automatically close said clamping members on said product and operating mechanism with which said holding means comes into operative relation when said latter means reaches the paring position.

3. A paring machine comprising a movable paring knife, a revolving turret, revolvable holding means carried by the turret and including members adapted to be closed upon a nut or similar product, means for intermittently revolving said turret to present said holding means into position for the product to be acted upon by said knife, means for automatically closing said clamping members on the product and means for ejecting the product as said holding means moves away from the paring position.

4. A paring machine comprising a movable paring knife and a revolving turret, revolvable holding means carried by said turret and including clamping members adapted to be closed upon a nut or similar product, means for intermittently rotating said turret to present said holding means into position for the product to be acted upon by said knife, means adapted to apply resistible pressure to close said clamping members on said product, and means for revolving said holding means.

5. A paring machine comprising a movable paring knife and a revolving turret, revolvable holding means carried by said turret, and including clamping members adapted to be closed upon a nut or similar product, means for intermittently rotating said turret to present said holding means into position for the product to be acted upon by said knife, adjustable means for applying resistible pressure to close said clamping members on said product, and means for revolving said holding means.

6. A paring machine comprising a movable paring knife and a revolving turret, revolvable holding means carried by said turret, and including clamping members adapted to be closed upon a nut or similar product, means for intermittently rotating said turret for the purpose set forth, a cam member and means movable with the turret and operated by said cam member for closing said clamping members on said product.

7. A paring machine comprising a movable paring knife and a revolving turret, revolvable holding means carried by said turret and including clamping members adapted to be closed upon a nut or similar product, means for intermittently rotating said turret for the purpose set forth, a pivoted, arcuate cam rail, means for adjusting said rail on its pivot and means movable with the turret and operated by said cam rail for closing said clamping members on the product.

8. A paring machine comprising a paring knife and means for moving it in relation to the product, and means for holding and revolving a nut or similar product in relation to said knife, comprising a support on which the product is adapted to rest and clamping members movable inwardly toward the product on said support for engaging and holding the product for the purpose set forth.

9. A paring machine comprising a paring knife and means for moving it in relation to the product, and means for holding and revolving a nut or similar product in relation to said knife, comprising a support on which the product is adapted to rest, clamping members movable inwardly toward the product on said support and adapted to leave the upper half of the product exposed to the action of said knife and means for revolving said support and said clamps as a unit.

10. A paring machine comprising a movable paring knife, means for holding and revolving a nut or similar product, including a journal socket, a sleeve revolvable therein, a support carried by the sleeve and having a plurality of clamping members adapted to clamp the product to be pared, a second sleeve revolvable with and arranged concentrically of said first sleeve and means carried by said second sleeve for actuating said clamps, means for revolving said sleeves in unison and means for moving a sleeve to operate said clamps.

11. A paring machine comprising a movable paring knife, a revolvable turret and means carried thereby for holding and revolving the product, including a journal socket on the turret, a sleeve revolvable therein, a support carried by the sleeve and having a plurality of clamping members adapted to clamp the product to be pared, a second sleeve revolvable with and arranged concentrically of said first sleeve, means carried by said second sleeve for actuating said clamps, means for revolving said sleeves in unison, means for moving a sleeve axially to operate said clamps, a rod in said sleeves, having a supporting member for the product inside said clamping members and below the place of engagement of the latter with the product, and means for reciprocating said rod.

12. A paring machine comprising a movable paring knife and means for moving it in relation to the product, and means for holding and revolving a nut or similar product, comprising a cylinder or basket having longitudinal slots therein, pivoted clamping members movable radially of said cylinder for engaging the product therein, said clamping members swinging in the slots in said cylinder, means for operating the clamps, and means for revolving said holding device.

13. A paring machine comprising means for holding and revolving a round or partially round product comprising a plurality of clamping members moving inwardly toward the axis of the product and exteriorly engaging circumferentially around the product near the horizontal central line thereof, with at least one half of the product unobstructed, a paring knife and means for imparting an arcuate movement thereto in relation to the product, starting with said knife at or near the middle line of the product and moving it toward the apex thereof.

14. A paring machine comprising means for holding and revolving a round or partially round product comprising a plurality of clamping members moving inwardly toward the axis of the product and exteriorly engaging circumferentially around the product near the horizontal central line thereof with at least one half of the product unobstructed, a paring knife, means for imparting an arcuate movement thereto in relation to the product, starting with said knife at or near the middle line of the product and moving it toward the apex thereof, and a spring adapted to press the knife against the product.

15. A paring machine comprising means for holding and revolving a round or partially round product with part of the product exposed to the paring knife, a paring knife and means for imparting an arcuate movement thereto in relation to the product, starting with the knife at or near the middle line of the product and moving it toward and axially beyond the apex thereof.

16. A paring machine comprising means for holding and revolving a round or partially round product with part thereof exposed to the paring knife, a shaft, a paring knife carried thereby and in spaced relation thereto, means for rocking said shaft to impart an arcuate movement to said knife starting with said knife at or near the middle line of said product and moving to the apex thereof, and adapted to raise said shaft to raise said knife axially above the apex of the product, and a spring for pressing said knife against the product.

Signed at New York, in the county of New York and State of New York, this 22nd day of July, 1919.

JOHN F. KOHLER.